United States Patent
Kobori et al.

(10) Patent No.: US 11,837,878 B2
(45) Date of Patent: Dec. 5, 2023

(54) CHARGING SYSTEM, CHARGING STATION, MOVABLE BODY, AND CHARGING METHOD

(71) Applicant: MITSUBISHI HEAVY INDUSTRIES, LTD., Tokyo (JP)

(72) Inventors: Syuhei Kobori, Tokyo (JP); Ken Onishi, Tokyo (JP); Noriko Onishi, Tokyo (JP); Koji Shukutani, Tokyo (JP); Hiroyoshi Okazaki, Tokyo (JP); Hiroyoshi Kojima, Tokyo (JP)

(73) Assignee: MITSUBISHI HEAVY INDUSTRIES, LTD., Tokyo (JP)

(*) Notice: Subject to any disclaimer, the term of this patent is extended or adjusted under 35 U.S.C. 154(b) by 527 days.

(21) Appl. No.: 17/254,604

(22) PCT Filed: Mar. 14, 2019

(86) PCT No.: PCT/JP2019/010488
§ 371 (c)(1),
(2) Date: Dec. 21, 2020

(87) PCT Pub. No.: WO2020/003639
PCT Pub. Date: Jan. 2, 2020

(65) Prior Publication Data
US 2021/0175751 A1    Jun. 10, 2021

(30) Foreign Application Priority Data
Jun. 29, 2018 (JP) .................. 2018-124652

(51) Int. Cl.
*H02J 7/00* (2006.01)
*H02J 50/12* (2016.01)
(Continued)

(52) U.S. Cl.
CPC ............. *H02J 50/12* (2016.02); *B25J 19/005* (2013.01); *B60L 50/60* (2019.02); *B60L 53/122* (2019.02);
(Continued)

(58) Field of Classification Search
USPC ....................................................... 320/108
See application file for complete search history.

(56) References Cited

U.S. PATENT DOCUMENTS

| 5,440,916 A | 8/1995 | Stone et al. | |
| 2011/0093139 A1* | 4/2011 | Arms | H02J 50/12 320/108 |
| 2014/0222271 A1* | 8/2014 | Merten | H02J 50/10 701/22 |

FOREIGN PATENT DOCUMENTS

| CN | 107856572 A | 3/2018 |
| JP | 2015-36172 A | 2/2015 |
| WO | 2018078948 A1 | 5/2018 |

OTHER PUBLICATIONS

The Extended European Search Report dated Jun. 24, 2021, issued in counterpart EP Application No. 19826148.9. (9 pages).
(Continued)

Primary Examiner — Samuel Berhanu
(74) Attorney, Agent, or Firm — WHDA, LLP

(57) ABSTRACT

A charging system includes: a movable body including a frame and a battery provided in the frame; and a charging station configured to charge the battery. The movable body includes: a pressure detection unit configured to detect pressure in the frame; and a charging permission signal output unit configured to output a charging permission signal indicating that the pressure in the frame is detected to be equal to or higher than a threshold pressure. The charging station includes: a charging permission signal acquisition unit configured to acquire the charging permission signal
(Continued)

from the charging permission signal output unit; and a power transmission unit configured to execute non-contact charging of the battery when the charging permission signal is acquired by the charging permission signal acquisition unit.

9 Claims, 6 Drawing Sheets

(51) Int. Cl.
| | |
|---|---|
| H02J 50/80 | (2016.01) |
| H02J 50/90 | (2016.01) |
| B60L 53/126 | (2019.01) |
| B60L 50/60 | (2019.01) |
| B60L 53/39 | (2019.01) |
| B60L 53/122 | (2019.01) |
| B25J 19/00 | (2006.01) |
| G05D 1/02 | (2020.01) |
| H02J 7/04 | (2006.01) |

(52) U.S. Cl.
CPC ............ *B60L 53/126* (2019.02); *B60L 53/39* (2019.02); *G05D 1/0225* (2013.01); *G05D 1/0276* (2013.01); *H02J 7/00032* (2020.01); *H02J 7/04* (2013.01); *H02J 50/80* (2016.02); *H02J 50/90* (2016.02)

(56) References Cited

OTHER PUBLICATIONS

International Search Report dated May 28, 2019, issued in counterpart International Application No. PCT/JP2019/010488. (1 page).

* cited by examiner

FIG.3

CHARGING SYSTEM, CHARGING STATION, MOVABLE BODY, AND CHARGING METHOD

FIELD

The present invention relates to a charging system, a charging station, a movable body, and a charging method.

BACKGROUND

When performing patrol inspection work or the like using a movable robot, the robot is required to be self-propelled and thus is equipped with a battery. In this case, when the amount of charge of the battery is reduced through patrol inspection work or the like, the robot needs to run to a charging station for power supply. When patrol inspection work is performed at, for example, a petrochemical plant, if oil or the like leaks, the work environment of the robot will become an explosive atmosphere to cause a fire upon ignition with sparks generated at actuation of the robot. Thus, the robot needs to have an explosion-proof structure in this case.

For example, an explosion-proof structure of a conventional robot is disclosed in Patent Literature 1 below. An industrial robot disclosed in Patent Literature 1 includes a control device, a battery, and a motor that are disposed on a movable frame, and has an internal pressure explosion-proof structure in which air is supplied into the frame from an air supply device to maintain the inside the frame at a pressure higher than a predetermined pressure.

CITATION LIST

Patent Literature

Patent Literature 1: JP 2015-036172 A

SUMMARY

Technical Problem

At power supply to the battery in the frame, the frame needs to be opened to connect the battery to a charging facility. However, when the frame is opened, the state in which the internal pressure is high is released, and thus it is needed to set the internal pressure to be high again after the charging is completed. Thus, a there is a need for a technology that enables appropriate charging without releasing the state in which the internal pressure in the frame is high.

The present invention has been made to solve the above-described problem, and an object of the present invention is to provide a charging system, a charging station, a movable body, and a charging method that enable appropriate charging without releasing a state in which the internal pressure in a frame is high.

Solution to Problem

To achieve the object described above, a charging system according to the present disclosure includes a movable body including a frame and a battery provided in the frame; and a charging station configured to charge the battery. The movable body includes a pressure detection unit configured to detect pressure in the frame, and a charging permission signal output unit configured to output a charging permission signal indicating that the pressure in the frame is detected to be equal to or higher than a threshold pressure. The charging station includes a charging permission signal acquisition unit configured to acquire the charging permission signal from the charging permission signal output unit, and a power transmission unit configured to execute non-contact charging of the battery when the charging permission signal is acquired by the charging permission signal acquisition unit.

Since the charging system performs non-contact charging when triggered by the charging permission signal, charging can be appropriately performed while the risk of ignition is reduced without releasing a state in which the internal pressure in the frame is high.

It is preferable that the charging permission signal output unit stops outputting the charging permission signal when the pressure in the frame is detected to be lower than the threshold pressure; and the power transmission unit stops the non-contact charging of the battery when the charging permission signal is not acquired by the charging permission signal acquisition unit. The charging system stops non-contact charging by stopping outputting of the charging permission signal when the internal pressure has been reduced. Thus, with the charging system, the risk of ignition due to charging can be reduced.

It is preferable that the movable body includes a movable body signal output unit configured to output a signal to a region that the movable body signal output unit faces; the charging station includes a station signal acquisition unit configured to acquire the signal from the movable body signal output unit; and the power transmission unit executes the non-contact charging of the battery when the signal from the movable body signal output unit is received by the station signal acquisition unit and the charging permission signal is acquired by the charging permission signal acquisition unit. With the charging system, the position of the movable body can be highly accurately checked by acquiring the signal from the movable body, and thus charging can be appropriately performed.

It is preferable that the charging station includes a station signal output unit configured to output a signal to a region that the station signal output unit faces; the movable body includes a movable body signal acquisition unit configured to acquire the signal from the station signal output unit when positioned in the region that the station signal output unit faces; and the movable body signal output unit outputs a signal when the signal from the station signal output unit is acquired by the movable body signal acquisition unit. With the charging system, both of the movable body and the charging station can check each other's positions, and thus charging can be appropriately performed.

It is preferable that the movable body includes a power reception coil connected with the battery; the power transmission unit of the charging station includes a power transmission coil configured to transmit power to the power reception coil in a non-contact manner, a movement unit configured to move the power transmission coil toward the power reception coil, and a power transmission control unit configured to cause the power transmission coil to perform power transmission; the movement unit moves the power transmission coil to a position facing the power reception coil; and the power transmission control unit causes the power transmission coil to perform power transmission when the power transmission coil is at the position facing the power reception coil and the charging permission signal is acquired by the charging permission signal acquisition unit. With the charging system, non-contact charging is performed based on results of positioning of the power transmission coil and the power reception coil. Thus, with the charging system, non-contact charging can be appropriately performed.

It is preferable that the charging station includes an interface position detection unit configured to detect whether the power transmission coil and the power reception coil are at appropriate positions; and the power transmission control unit causes the power transmission coil to perform power transmission when the power transmission coil and the power reception coil are at the appropriate positions. With the charging system, non-contact charging is performed when the power transmission coil and the power reception coil are at the appropriate positions. Thus, with the charging system, non-contact charging can be appropriately performed.

It is preferable that the frame of the movable body has an internal pressure explosion-proof structure. With the charging system, the battery of the movable body having the internal pressure explosion-proof structure can be excellently charged without releasing an internal pressure explosion-proof state.

To achieve the object described above, a charging station according to the present disclosure is for charging a movable body that includes a frame, a battery provided in the frame, and a pressure detection unit configured to detect pressure in the frame. The charging station includes: a charging permission signal acquisition unit configured to acquire, from the movable body, a charging permission signal indicating that the pressure in the frame is equal to or higher than a threshold pressure; and a power transmission unit configured to execute non-contact charging of the battery when the charging permission signal is acquired by the charging permission signal acquisition unit. With the charging station, charging can be appropriately performed while the risk of ignition is reduced without releasing the state in which the internal pressure in the frame is high.

To achieve the object described above, a movable body according to the present disclosure includes: a frame; a pressure detection unit configured to detect pressure in the frame; a charging permission signal output unit configured to output, to a charging station, a charging permission signal indicating that the pressure in the frame is detected, by the pressure detection unit, to be equal to or higher than a threshold pressure; and a power reception unit configured to be charged in a non-contact manner from the charging station having acquired the charging permission signal. With the movable body, charging can be appropriately performed while the risk of ignition is reduced without releasing the state in which the internal pressure in the frame is high.

To achieve the object described above, a charging method according to the present disclosure is performed by a charging device for charging a movable body that includes a frame and a battery provided in the frame. The charging method includes: a charging permission signal outputting step of outputting a charging permission signal from the movable body toward the charging device when the pressure in the frame is detected to be equal to or higher than a threshold pressure; and a charging step of executing non-contact charging of the battery when the charging permission signal is acquired by the charging device. With the charging method, charging can be appropriately performed while the risk of ignition is reduced without releasing the state in which the internal pressure in the frame is high.

Advantageous Effects of Invention

According to the present invention, charging is appropriately performed without releasing a state in which the internal pressure in the frame is high.

BRIEF DESCRIPTION OF DRAWINGS

FIG. 3 is a schematic diagram for description of charging between the movable body and the charging station.

DESCRIPTION OF EMBODIMENTS

A preferred embodiment of the present invention will be described below in detail with the accompanying drawings. The present invention is not limited by the embodiment. Components in the embodiment described below include those that could be replaced and easily thought of by the skilled person in the art or those identical in effect.

A charging system 1 of the present embodiment includes a movable body 10 (refer to FIG. 1) and a charging station 100 (refer to FIG. 2) configured to charge the movable body 10. The charging system 1 is a system in which the movable body 10 is charged at the charging station 100, for example, in a facility where the movable body 10 moves in a petrochemical plant and performs patrol inspection work. In the petrochemical plant, if oil or the like leaks, the work environment of the movable body becomes an explosive atmosphere. Thus, the movable body 10 has an explosion-proof structure. In the present embodiment, the movable body 10 is an industrial robot configured to perform work such as disaster prevention support work, building maintenance work, or patrol in an explosive atmosphere. The work environment in which the movable body 10 performs work includes a wide range of fields that may generate flammable gas, such as a petrochemical plant, a manufacturing-storage-management facility for dangerous substances such as flammable liquids, a coating facility, a solvent using facility, a high pressure gas facility, and a fuel battery related facility.

Configuration of Movable Body

Figure 1:
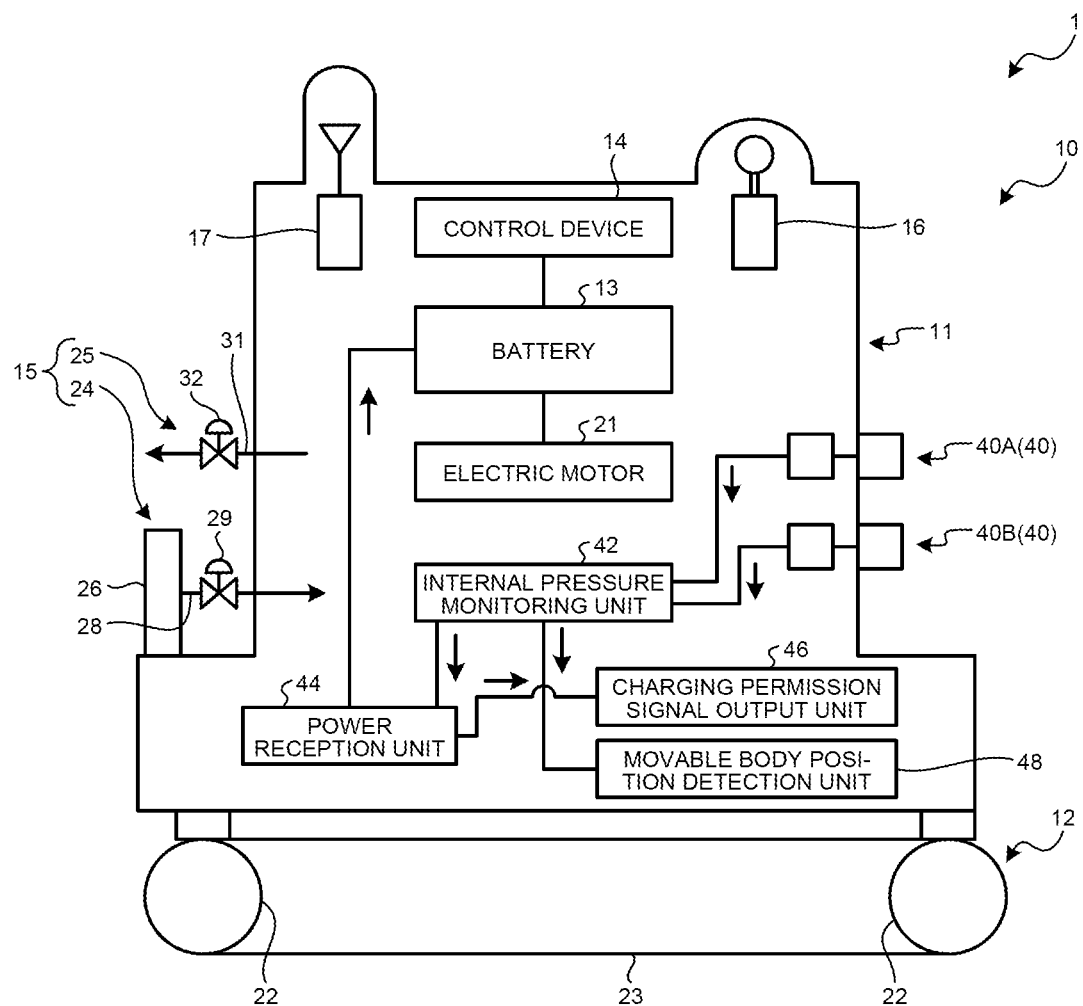
FIG. 1 is a schematic diagram illustrating a movable body of the present embodiment.

The following first describes the movable body 10. FIG. 1 is a schematic diagram illustrating the movable body of the present embodiment. The movable body 10 is a robot, more specifically, an industrial robot. As illustrated in FIG. 1, the movable body 10 includes a frame 11, a movement device 12, a battery 13, a control device 14, an internal pressure explosion-proof device 15, a camera 16, and a communication device 17. Although not illustrated, the movable body 10 may include, for example, a robotic arm.

The frame 11 has a hollow box shape and a sealing structure. The frame 11 is a container that prevents entry of explosive gas from the outside by maintaining the pressure of internal gas higher than the pressure of external gas by the internal pressure explosion-proof device 15 to be described later. In other words, the frame 11 is an internal pressure explosion-proof container having an internal pressure explosion-proof structure. The frame 11 can travel independently by being provided with the movement device 12 at the power part. The movement device 12 includes an electric motor 21, a drive sprocket 22, and a crawler 23. The electric motor 21 is mounted in the frame 11, the drive sprockets 22 are mounted at front and back lower parts on both sides of the frame 11, and each crawler 23 is wound around the front and back drive sprockets 22 on the corresponding one of the right and left sides. The movement device 12 is not limited to the four drive sprockets 22 and the crawlers 23 but may include a plurality of drive wheels.

The battery 13 and the control device 14 are mounted in the frame 11. The battery 13 can supply power to the control device 14 and the electric motor 21. The control device 14 can control forward movement, backward movement, stopping of the frame 11, that is, the movable body 10 through the movement device 12 by controlling drive of the electric motor 21.

The internal pressure explosion-proof device 15 prevents external gas from entering the inside of the frame 11 by maintaining the pressure inside the frame 11 higher than the pressure outside the frame 11. The internal pressure explosion-proof device 15 includes an air supply device 24 and an exhaust device 25. The air supply device 24 is provided with an air supply line 28 extending from an air tank 26 provided outside the frame 11 to the inside through the frame 11. The air supply line 28 is provided with a decompression valve 29 on the outside of the frame 11 and has an end part opened. Thus, normally, pressurized gas in the air tank 26 is supplied into the frame 11 through the air supply line 28, and the pressure inside the frame 11 is maintained at a constant set pressure higher than the external pressure by the decompression valve 29.

The exhaust device 25 includes an air discharge line 31 penetrating the frame 11 and extending to the inside, and the air discharge line 31 is provided with a relief valve 32 on the outside of the frame 11 and has an end part opened. Thus, when the temperature inside the frame 11 rises and the pressure inside the frame 11 becomes higher than the set pressure, the air inside the frame 11 is discharged to the outside through the air discharge line 31 by the relief valve 32, thereby lowering the pressure inside the frame 11.

The camera 16 is mounted at an upper part in the frame 11. The camera 16 is controlled by the control device 14 to capture an image of the outside and output the captured image to the control device 14. The communication device 17 can perform communication with an external administrative room (not illustrated) and the like. The communication device 17 transfers, to the control device 14, information input from the outside and transfers information from the control device 14, such as the captured image by the camera 16, to the outside.

The movable body 10 also includes pressure detection units 40A and 40B, an internal pressure monitoring unit 42, a power reception unit 44, a charging permission signal output unit 46, and a movable body position detection unit 48. The pressure detection units 40A and 40B are devices (sensors) configured to detect the pressure inside the frame 11. The pressure detection units 40A and 40B detect whether the pressure inside the frame 11 is equal to or higher than the threshold pressure. The threshold pressure is a pressure set in advance and equal to or higher than the pressure inside the frame 11. For example, the threshold pressure may be set to be equal to or higher than atmospheric pressure. The pressure detection units 40A and 40B may include a pressure sensor configured to detect the pressure inside the frame 11 and a pressure sensor configured to detect the pressure outside the frame 11 and may detect pressures inside and outside the frame 11. In this case, the pressure detection units 40A and 40B may detect whether the pressure inside the frame 11 is equal to or higher than the pressure outside the frame 11 as the threshold pressure. In the present embodiment, two pressure detection units are provided for improving safety, but one pressure detection unit may be provided or three or more pressure detection units may be provided. Hereinafter, the pressure detection units 40A and 40B are referred to as pressure detection units 40 when not distinguished from each other.

The internal pressure monitoring unit 42 is provided in the frame 11. Based on detection results of the pressure detection units 40, the internal pressure monitoring unit 42 switches between transmitting and stopping the signal to the power reception unit 44 and also switches between supplying and stopping the power to the movable body position detection unit 48. When the pressure detection units 40 detect that the pressure inside the frame 11 is equal to or higher than the threshold pressure, the internal pressure monitoring unit 42 transmits, to the power reception unit 44, a signal indicating that charging is possible, and power is supplied to the movable body position detection unit 48. When the pressure detection units 40 detect that the pressure inside the frame 11 is lower than the threshold pressure, the internal pressure monitoring unit 42 does not transmit, to the power reception unit 44, the signal indicating that charging is possible, and power supply is stopped to the movable body position detection unit 48. Thus, the internal pressure monitoring unit 42 is a switch element configured to switch on and off the contacts to the power reception unit 44 and the movable body position detection unit 48 based on detection results of the pressure detection units 40, which will be described in detail later. When the pressure inside the frame 11 is detected by the pressure detection units 40 to be equal to or higher than the threshold pressure, the internal pressure monitoring unit 42 may supply power to the movement device 12 (the electric motor 21), the control device 14, the camera 16, and the communication device 17. When the pressure inside the frame 11 is detected by the pressure detection units 40 to be lower than the threshold pressure, the internal pressure monitoring unit 42 may stop power supply to the movement device 12 (the electric motor 21), the control device 14, the camera 16, and the communication device 17.

The power reception unit 44 is a device (charger) connected with the battery 13 and configured to charge the battery 13 by receiving power from the charging station 100. The configuration of the power reception unit 44 will be described later.

The charging permission signal output unit 46 outputs a charging permission signal L0 based on detection results of the pressure detection units 40. The charging permission signal output unit 46 outputs the charging permission signal L0 when the pressure inside the frame 11 is detected by the pressure detection units 40 to be equal to or higher than the threshold pressure, and stops outputting the charging permission signal L0 when the pressure inside the frame 11 is detected by the pressure detection units 40 to be lower than the threshold pressure. In the present embodiment, the charging permission signal output unit 46 outputs the charging permission signal L0 when the signal indicating that charging is possible is transmitted from the internal pressure monitoring unit 42 to the power reception unit 44. Details of the charging permission signal output unit 46 will be described later.

The movable body position detection unit 48 outputs a signal (a movable body signal L2 to be described later)

based on detection results of the pressure detection units 40 and based on whether a signal (a station signal L1 to be described later) from the charging station 100 is acquired. When the pressure inside the frame 11 is detected by the pressure detection units 40 to be equal to or higher than the threshold pressure and the signal (the station signal L1 to be described later) from the charging station is acquired, the movable body position detection unit 48 outputs the signal (the movable body signal L2 to be described later). When at least one of two conditions is not satisfied, the movable body position detection unit 48 outputs no signal (the movable body signal L2 to be described later). The two conditions are: a condition in which the pressure inside the frame 11 is detected by the pressure detection units 40 to be equal to or higher than the threshold pressure; and a condition in which the signal (the station signal L1 to be described later) is acquired from the charging station. Details of the movable body position detection unit 48 will be described later.

The movable body 10 configured as described above can move forward, backward, and stop through control of the movement device 12 by the control device 14. The movable body 10 can be steered by adjusting the speeds of the right and left crawlers 23 through control of the movement device 12 by the control device 14. In the movable body 10, the control device 14 stores a patrol map and determines a moving route based on this map information and distance information detected by a sensor mounted on the movable body 10. The movable body 10 may determine a moving route in accordance with position signals from the GPS.

The movable body 10 needs to be subjected to power supply when the charged amount of the battery 13 has reduced through patrol inspection work or the like. Thus, in the present embodiment, the charging station 100 is provided in a patrol inspection work zone. Subsequently, the charging station 100 will be described.

Configuration of Charging Station

The charging station 100 is provided in a facility in which the movable body 10 performs work. Thus, the charging station 100 is provided in an explosive atmosphere. Thus, the charging station 100 has an explosion-proof structure, more specifically, a pressure-resistant explosion-proof structure. The charging station 100 charges the movable body 10 when the movable body 10 has moved into a charging region Po (refer to FIG. 5) and conditions described below are satisfied. The charging region Po is set as a region in which the movable body 10 needs to be positioned in order to enable non-contact charging by the charging station 100. The charging region Po is in a predetermined region facing the charging station 100. The charging station 100 may replenish the movable body 10 with internal pressure gas in addition to charging of the movable body 10.

Figure 2:
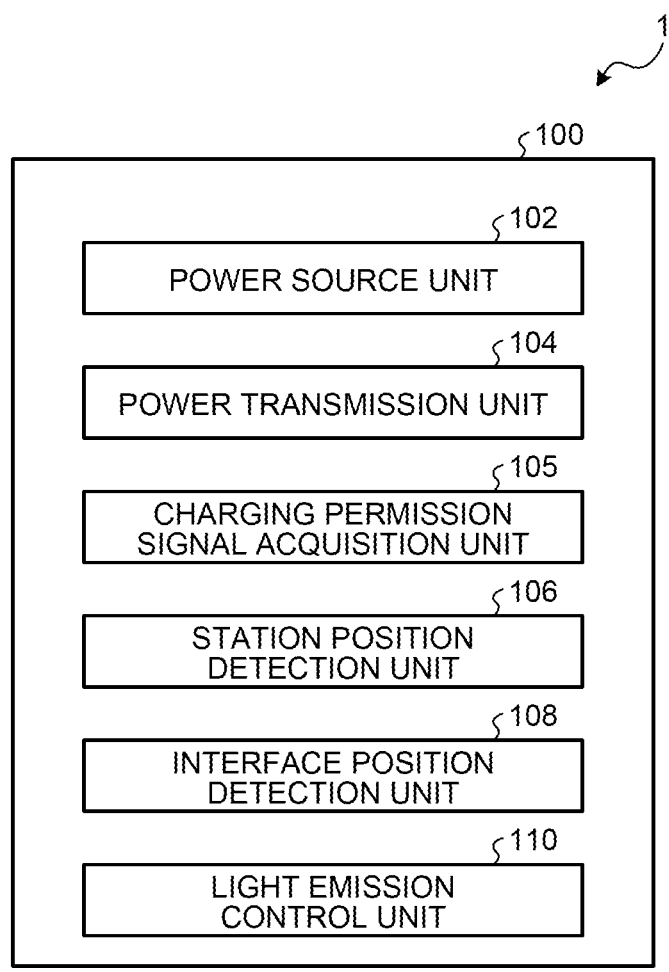
FIG. 2 is a schematic block diagram of a charging station according to the present embodiment.

FIG. 2 is a schematic block diagram of the charging station according to the present embodiment. As illustrated in FIG. 2, the charging station 100 includes a power source unit 102, a power transmission unit 104, a charging permission signal acquisition unit 105, a station position detection unit 106, an interface position detection unit 108, and a light emission control unit 110. The power source unit 102, the power transmission unit 104, the charging permission signal acquisition unit 105, the station position detection unit 106, the interface position detection unit 108, and the light emission control unit 110 are disposed in the pressure-resistant explosion-proof structure of the charging station 100.

The power source unit 102 is a power source capable of supplying power. The power transmission unit 104 is a device configured to charge the battery 13 of the movable body 10 with power from the power source unit 102. The power transmission unit 104 charges the battery 13 of the movable body 10 by non-contact charging. The charging permission signal acquisition unit 105 can acquire a charging permission signal from the charging permission signal output unit 46 of the movable body 10 being positioned in the charging region Po. When having acquired a signal (the movable body signal L2 to be described later) from the movable body position detection unit 48 of the movable body 10, the station position detection unit 106 moves a power transmission coil 166 (refer to FIG. 3) of the power transmission unit 104 toward a power reception coil 66 (refer to FIG. 3) of the power reception unit 44 of the movable body 10. The interface position detection unit 108 detects a relative position between the power transmission coil 166 and the power reception coil 66. The light emission control unit 110 controls light emission of the station position detection unit 106 and the interface position detection unit 108. The configuration of each component of the charging station 100 will be described below in detail based on FIG. 3.

Functional Configurations of Movable Body and Charging Station

Figure 3:
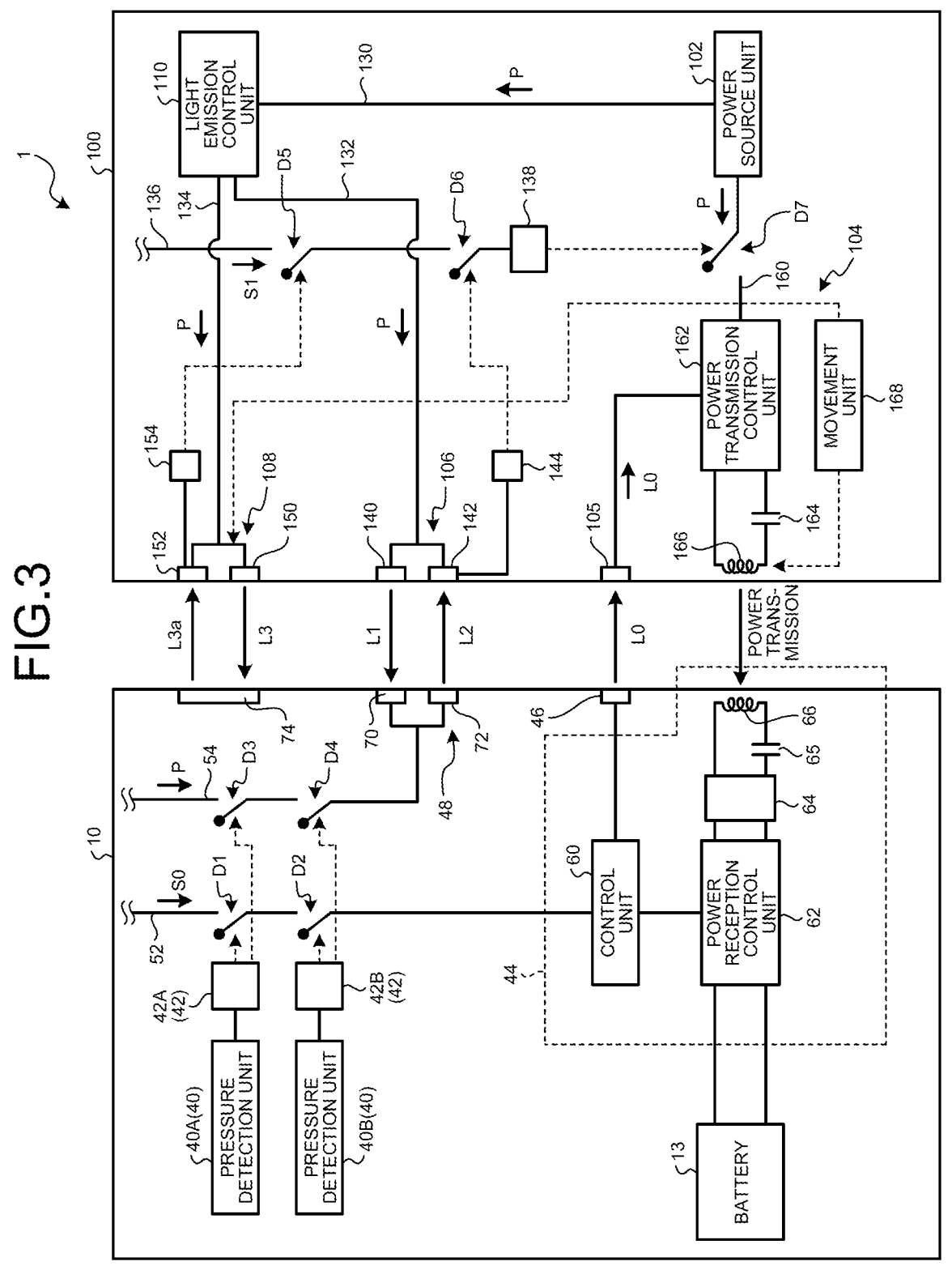

FIG. 3 is a schematic diagram for description of charging between the movable body and the charging station. FIG. 3 is a block diagram of components of the movable body 10 and the charging station 100, which are used when charging is performed, illustrating functional configurations thereof. As illustrated in FIG. 3, in the movable body 10, the pressure detection unit 40A is connected with an internal pressure monitoring unit 42A, and the pressure detection unit 40B is connected with an internal pressure monitoring unit 42B. In other words, one pressure detection unit 40 is connected with one internal pressure monitoring unit 42. Detection results of the pressure inside the frame 11 detected by the pressure detection units 40 are converted into digital data by an AD converter (not illustrated). The internal pressure monitoring unit 42 acquires the detection results of the pressure detection units 40, which is converted into the digital data.

The internal pressure monitoring unit 42A is a switch element capable of operating a contact point D1 that is connected with a signal line 52 to be described later and a contact point D3 that is connected with an electrical line 54 to be described later. When the internal pressure of the frame 11 is equal to or higher than the threshold pressure based on the detection result of the pressure detection unit 40A, the internal pressure monitoring unit 42A puts the contact points D1 and D3 into closed states (connected states). When the internal pressure of the frame 11 is lower than the threshold pressure based on the detection result of the pressure detection unit 40A, the internal pressure monitoring unit 42A puts the contact points D1 and D3 into opened states (disconnected states). The internal pressure monitoring unit 42B is a switch element capable of operating a contact point D2 that is connected with the signal line 52 and a contact point D4 that is connected with the electrical line 54. When the internal pressure of the frame 11 is equal to or higher than the threshold pressure based on the detection result of the pressure detection unit 40B, the internal pressure monitoring unit 42B puts the contact points D2 and D4 into closed states (connected states). When the internal pressure of the frame 11 is lower than the threshold pressure based on the result of detection by the pressure detection unit 40B, the internal pressure monitoring unit 42B puts the contact points D2 and D4 into opened states (disconnected states). In this manner, the number of internal pressure monitoring units 42 is two in accordance with the number of pressure detection units 40, but may be, for example, one when the number of pressure detection units 40 is one. In this case, the number of contact points is one for each of the signal line 52 and the electrical line 54. When the number of pressure detection units 40 is equal to or larger than three, the number of internal pressure monitoring units 42, the number of contact points of the signal line 52, and the number of contact points of the electrical line 54 are each equal to or larger than three in accordance with the number of pressure detection units 40.

As illustrated in FIG. 3, in the movable body 10, the power reception unit 44 is connected with the signal line 52. The power reception unit 44 includes a control unit 60, a power reception control unit 62, a smoothing circuit 64, a capacitor 65, and the power reception coil 66. The control unit 60 is an arithmetic device, in other words, a central processing unit (CPU) configured to control the power reception unit 44. The control unit 60 is connected with the signal line 52 and can receive, from the signal line 52, a signal S0 indicating that the movable body 10 is to be charged. More specifically, the signal line 52 is connected with, for example, a battery control unit (not illustrated) included in the battery 13. The battery control unit checks the current charged amount (battery remaining amount) of the battery 13 and outputs the signal S0 to the signal line 52 when charging is needed. In other words, the signal S0 is a signal serving as a trigger for requesting charging. The signal line 52 is connected in series with the contact points D1 and D2. When the internal pressure of the frame 11 is equal to or higher than the threshold pressure based on the detection results of the pressure detection units 40A and 40B, the contact points D1 and D2 become the closed states (connected states), so that the control unit 60 is connected with the signal line 52. In other words, when the contact points D1 and D2 are both in the closed states (connected states), the control unit 60 receives the signal S0 from the signal line 52. When the internal pressure of the frame 11 is lower than the threshold pressure based on at least one of the detection results of the pressure detection units 40A and 40B, at least one of the contact points D1 and D2 becomes the opened state (disconnected state), so that the control unit 60 is not connected with the signal line 52. In other words, when at least one of the contact points D1 and D2 is in the opened state, the control unit 60 stops receiving the signal S0 from the signal line 52 (does not receive the signal S0).

When having received the signal S0 from the signal line 52, the control unit 60 transmits a control signal to the power reception control unit 62. The control signal is a signal for controlling charging of the battery 13 and is a signal that serves as a trigger for causing the power reception control unit 62 to start the charging. The control signal may include a signal instructing a charging scheme such as constant voltage (CV) charging or constant current (CC) charging.

The power reception control unit 62 is a control circuit configured to control charging of the battery 13, in other words, a control circuit configured to control the amount of power received by the power reception coil 66. The power reception control unit 62 is connected with the control unit 60 to acquire the control signal from the control unit 60. The smoothing circuit 64 is connected with the power reception control unit 62. The smoothing circuit 64 is a circuit configured to rectify and convert alternating current received by the power reception coil 66 into direct current and smooth the rectified direct current. The capacitor 65 and the power reception coil 66 are connected with the power reception control unit 62 through the smoothing circuit 64. The capacitor 65 and the power reception coil 66 are connected in series with each other to form a series resonance circuit. The power reception control unit 62 controls power reception by the power reception coil 66 based on the control signal from the control unit 60. The power reception coil 66 is connected with the battery 13 through the smoothing circuit 64 and the power reception control unit 62. Power (alternating-current power) received by the power reception coil 66 is rectified by the smoothing circuit 64 into direct-current power and is output to the battery 13 to charge the battery 13.

The control unit 60 is also connected with the charging permission signal output unit 46. When having received the signal S0 from the signal line 52, the control unit 60 outputs, to the charging permission signal output unit 46, a signal indicating that the charging permission signal is to be output. Having acquired, from the control unit 60, the signal indicating that the charging permission signal is to be output, the charging permission signal output unit 46 outputs the charging permission signal L0. Specifically, the charging permission signal output unit 46 outputs the charging permission signal L0 when the internal pressure of the frame 11 is equal to or higher than the threshold pressure based on the detection results of the pressure detection units 40A and 40B. The charging permission signal output unit 46 stops outputting the charging permission signal L0 (does not output the charging permission signal L0) when the internal pressure of the frame 11 is lower than the threshold pressure based on at least one of the detection results of the pressure detection units 40A and 40B. Thus, the charging permission signal L0 is a signal indicating that the pressure inside the frame 11 has been detected to be equal to or higher than the threshold pressure, and is a signal indicating that the charging station 100 is permitted to perform charging.

The charging permission signal L0 is a signal for permitting the charging station 100 to perform charging, and is a signal that serves as a trigger for starting charging by the charging station 100. In the present embodiment, the charging permission signal output unit 46 outputs the charging permission signal L0 as light. In other words, the charging permission signal output unit 46 is a light source configured to emit light of the charging permission signal L0. The charging permission signal L0 is, for example, infrared light but may be visible light or the like. The charging permission signal L0 is not limited to an optical signal as long as a signal does not cause ignition in a volatile atmosphere, and may be, for example, radio wave or ultrasonic wave. Specifically, the control unit 60 may output the charging permission signal L0 to the charging station 100 through, for example, a wireless network using radio wave, such as Wi-Fi (registered trademark), Bluetooth (registered trademark), or specified low power radio, or ultrasonic wave communication using ultrasonic wave.

In the movable body 10, the movable body position detection unit 48 is connected with the electrical line 54. The movable body position detection unit 48 is a mechanism for detecting a relative position between the movable body 10 and the charging station 100, in other words, a mechanism for detecting whether the movable body 10 is positioned in the charging region Po. The movable body position detection unit 48 includes a movable body signal acquisition unit 70 and a movable body signal output unit 72. The movable body signal acquisition unit 70 acquires the station signal L1 from a station signal output unit 140 of the charging station 100 to be described later. Since the station signal L1 in the present embodiment is light, the movable body signal acquisition unit 70 in the present embodiment is a light receiving element. Specifically, the movable body signal acquisition unit 70 detects that the station signal L1 has been acquired when the station signal L1 has entered the movable body signal acquisition unit 70, and does not detect that the station signal L1 has been acquired when the station signal L1 has not entered the movable body signal acquisition unit 70.

The movable body signal output unit 72 outputs a movable body signal L2 when the station signal L1 is received by the movable body signal acquisition unit 70. When the station signal L1 is not received by the movable body signal acquisition unit 70, the movable body signal output unit 72 stops outputting the movable body signal L2 (does not output the movable body signal L2). In the present embodiment, the movable body signal output unit 72 outputs the movable body signal L2 as light. In other words, the movable body signal output unit 72 is a light source configured to emit light of the movable body signal L2. The movable body signal L2 is, for example, visible light, and the movable body signal output unit 72 is a laser emitting diode (LED). The movable body signal output unit 72 emits, for example, visible light of red as the movable body signal L2. However, the movable body signal L2 is not limited to visible light but may be, for example, infrared light. The movable body signal L2 is not limited to an optical signal as long as the signal does not cause ignition in an explosive atmosphere, and may be, for example, ultrasonic wave or radio wave.

The movable body signal acquisition unit 70 and the movable body signal output unit 72 are each connected with the electrical line 54 to operate upon reception of power P from the electrical line 54. The electrical line 54 is connected with, for example, the battery 13 to supply the power P from the battery 13. The electrical line 54 has the contact points D3 and D4 connected in series. The movable body signal acquisition unit 70 and the movable body signal output unit 72 are connected with the electrical line 54 when the contact points D3 and D4 are both in the closed states (connected states), in other words, when the internal pressure of the frame 11 is equal to or higher than the threshold pressure based on the detection results of the pressure detection units 40A and 40B. When the contact points D3 and D4 are both in the closed states (connected states), the movable body signal acquisition unit 70 and the movable body signal output unit 72 receive the power P from the electrical line 54 and perform operation, in other words, light reception and light emission. When at least one of the contact points D3 and D4 is in the opened state (disconnected state), in other words, when the internal pressure of the frame 11 is lower than the threshold pressure based on at least one of the detection results of the pressure detection units 40A and 40B, the movable body signal acquisition unit 70 and the movable body signal output unit 72 are not connected with the electrical line 54. When at least one of the contact points D3 and D4 is in the opened state (disconnected state), the movable body signal acquisition unit 70 and the movable body signal output unit 72 stop operation, in other words, light reception and light emission because supply of the power P from the electrical line 54 is stopped.

The movable body 10 is also provided with a reflection unit 74. The reflection unit 74 is a mechanism for detecting whether the power reception coil 66 of the movable body 10 and the power transmission coil 166 (to be described later) of the charging station 100 are at appropriate positions, in other words, is a mechanism for positioning the power reception coil 66 and the power transmission coil 166. The reflection unit 74 receives a signal (interface signal L3) from an interface signal output unit 150 of the charging station 100 to be described later and reflects the received signal. Since the interface signal L3 is light in the present embodiment, the reflection unit 74 is a member capable of reflecting light.

As illustrated in FIG. 3, the light emission control unit 110 of the charging station 100 is connected with the power source unit 102 through an electrical line 130 to receive supply of the power P from the power source unit 102. A converter may be provided between the power source unit 102 and the light emission control unit 110. In this case, for example, alternating-current power from the power source unit 102 is converted into direct-current power by the converter, and the power P converted into direct-current power is supplied to the light emission control unit 110. The light emission control unit 110 is a device configured to control operation of the station position detection unit 106 and the interface position detection unit 108, in other words, light emission.

In the charging station 100, the station position detection unit 106 is connected with the light emission control unit 110 through an electrical line 132. The station position detection unit 106 is a mechanism for detecting a relative position between the movable body 10 and the charging station 100, in other words, is a mechanism for detecting whether the movable body 10 is positioned in the charging region Po. The station position detection unit 106 includes the station signal output unit 140, a station signal acquisition unit 142, and a switch unit 144. The station signal output unit 140 outputs the station signal L1. In the present embodiment, the station signal output unit 140 outputs the station signal L1 as light. In other words, the station signal output unit 140 is a light source configured to emit light of the station signal L1. The station signal L1 is, for example, visible light, and the station signal output unit 140 is a laser emitting diode (LED). The station signal output unit 140 emits, for example, visible light of red as the station signal L1. However, the station signal L1 is not limited to visible light but may be, for example, infrared light. The station signal L1 is not limited to an optical signal as long as the signal does not cause ignition in an explosive atmosphere, and may be, for example, ultrasonic wave or radio wave.

The station signal output unit 140 continuously outputs the station signal L1, in other words, emits light. However, as will be described later, the station signal output unit 140 stops outputting the station signal L1 during a predetermined time when the movable body 10 departs after charging is completed.

The station signal acquisition unit 142 acquires the movable body signal L2 from the movable body signal output unit 72 of the movable body 10. Since the movable body signal L2 in the present embodiment is light, the station signal acquisition unit 142 in the present embodiment is a light receiving element. Specifically, the station signal acquisition unit 142 detects that the station signal L1 has been acquired when the movable body signal L2 has entered the station signal acquisition unit 142, and does not detect that the station signal L1 has been acquired when the movable body signal L2 has not entered the station signal acquisition unit 142.

The switch unit 144 is connected with the station signal acquisition unit 142. The switch unit 144 is a switch element capable of operating a contact point D6 that is connected with a signal line 136 to be described later. When the movable body signal L2 is acquired (light thereof is received) by the station signal acquisition unit 142, the switch unit 144 puts the contact point D6 into a closed state (connected state). When the movable body signal L2 is not acquired (light thereof is not received) by the station signal acquisition unit 142, the switch unit 144 puts the contact point D6 into an opened state (disconnected state).

The station signal output unit 140 and the station signal acquisition unit 142 perform operation, in other words, light emission and light reception upon reception of supply of the power P from the light emission control unit 110. Specifically, the light emission control unit 110 controls the operation, in other words, light emission and light reception of the station signal output unit 140 and the station signal acquisition unit 142 by controlling power supply to the station signal output unit 140 and the station signal acquisition unit 142. The light emission control unit 110 operates the station signal output unit 140 and the station signal acquisition unit 142 by supplying power to the station signal output unit 140 and the station signal acquisition unit 142, and stops the operation of the station signal output unit 140 and the station signal acquisition unit 142 by stopping power supply to the station signal output unit 140 and the station signal acquisition unit 142.

In the charging station 100, the interface position detection unit 108 is connected with the light emission control unit 110 through an electrical line 134. The interface position detection unit 108 is a mechanism for detecting whether the power reception coil 66 of the movable body 10 and the power transmission coil 166 (to be described later) of the charging station 100 are at appropriate positions, in other words, is a mechanism for positioning the power reception coil 66 and the power transmission coil 166. The interface position detection unit 108 includes the interface signal output unit 150, an interface signal acquisition unit 152, and a switch unit 154.

The interface signal output unit 150 outputs the interface signal L3. In the present embodiment, the interface signal output unit 150 outputs the interface signal L3 as light. In other words, the interface signal output unit 150 is a light source configured to emit light of the interface signal L3. The interface signal L3 is, for example, visible light, and the interface signal output unit 150 is an LED. The interface signal output unit 150 emits, for example, visible light of red as the interface signal L3. However, the interface signal L3 is not limited to visible light but may be, for example, infrared light. The interface signal L3 is not limited to an optical signal as long as the signal does not cause ignition in an explosive atmosphere. In other words, the interface signal output unit 150 is not limited to a device configured to detect whether the power reception coil 66 and the power transmission coil 166 are at appropriate positions using the light signal. The interface signal output unit 150 may be, for example, a limit switch configured to output a contact point signal, a proximity sensor, a magnetic sensor configured to output a magnetic signal, or an ultrasonic wave sensor configured to output an ultrasonic wave signal.

When the power reception coil 66 and the power transmission coil 166 are at appropriate positions, the interface signal L3 from the interface signal output unit 150 is output toward the reflection unit 74 of the movable body 10. The reflection unit 74 reflects the interface signal L3 as a reflection signal L3a. The reflection signal L3a is reflected light of the interface signal L3. The interface signal acquisition unit 152 acquires the reflection signal L3a from the reflection unit 74. Since the reflection signal L3a is light, the interface signal acquisition unit 152 in the present embodiment is a light receiving element. Specifically, the interface signal acquisition unit 152 detects that the reflection signal L3a has been acquired when the reflection signal L3a has entered the interface signal acquisition unit 152.

The switch unit 154 is connected with the interface signal acquisition unit 152. The switch unit 154 is a switch element capable of operating a contact point D5 that is connected with the signal line 136 to be described later. When the reflection signal L3a acquired (light thereof received) by the interface signal acquisition unit 152 satisfies a predetermined condition, the switch unit 154 puts the contact point D5 into a closed state (connected state). When the reflection signal L3a acquired (light thereof received) by the interface signal acquisition unit 152 does not satisfy the predetermined condition, the switch unit 154 puts the contact point D5 into an opened state (disconnected state). The predetermined condition is such that, for example, the intensity of the reflection signal L3a is in a threshold intensity range. Specifically, when the intensity of the reflection signal L3a is in the threshold intensity range, the interface position detection unit 108 determines that the power reception coil 66 and the power transmission coil 166 are at appropriate positions and the reflection signal L3a is appropriately reflected on the interface signal L3, and puts the contact point D5 into the closed state (connected state). When the intensity of the reflection signal L3a is out of the threshold intensity range, the interface position detection unit 108 determines that the reflection signal L3a is not appropriately reflected on the interface signal L3 because the power reception coil 66 and the power transmission coil 166 are not at appropriate positions or a foreign object is interposed between the power reception coil 66 and the power transmission coil 166, and puts the contact point D5 into the opened state (disconnected state). The case in which the intensity of the reflection signal L3a is out of the threshold intensity range includes a case in which the intensity of the reflection signal L3a is too high or too low as well as a case in which light of the reflection signal L3a cannot be received.

In the charging station 100, the signal line 136 is connected with a switch unit 138. For example, a signal S1 is output to the signal line 136 from a control unit (not illustrated) in the charging station 100. The signal S1 is a signal that serves as a trigger for causing the power transmission unit 104 to start charging. The signal line 136 is provided with the contact points D5 and D6. The switch unit 138 is a switch element configured to operate a contact point D7 that is connected with an electrical line 160 to be described later. When the contact points D5 and D6 are both in the closed states (connected states), the switch unit 138 receives the signal S1. When the contact points D5 and D6 are both in the closed states, the switch unit 138 receives the signal S1 and puts the contact point D7 into a closed state (connected state). Specifically, when the movable body signal L2 is acquired (light thereof is received) by the station signal acquisition unit 142 and the reflection signal L3a acquired by the interface signal acquisition unit 152 satisfies the predetermined condition, the switch unit 138 puts the contact point D7 into the closed state (connected state). When at least one of the contact points D5 and D6 is in the opened state (disconnected state), the switch unit 138 stops receiving the signal S1 (does not receive the signal S1) and puts the contact point D7 into an opened state (disconnected state). Specifically, when at least one of two cases is not satisfied, the switch unit 138 puts the contact point D7 into the opened state (disconnected state). The two cases are: a case in which the movable body signal L2 (reception of light thereof) is acquired by the station signal acquisition unit 142; and a case in which the reflection signal L3a acquired by the interface signal acquisition unit 152 satisfies the predetermined condition.

In the charging station 100, the power transmission unit 104 is connected with the power source unit 102 through the electrical line 160. The electrical line 160 is provided with the contact point D7 and supplied with the power P from the power source unit 102. When the contact point D7 is in the closed state (connected state), in other words, when the movable body signal L2 is acquired (light thereof is received) by the station signal acquisition unit 142, and the reflection signal L3a acquired by the interface signal acquisition unit 152 satisfies the predetermined condition, the power transmission unit 104 receives power supply from the power source unit 102. When the contact point D7 is in the opened state (disconnected state), in other words, when at least one of two cases is not satisfied, the power supply from the power source unit 102 to the power transmission unit 104 is stopped. The two cases are: a case in which the movable body signal L2 is acquired (light thereof is received) by the station signal acquisition unit 142; and a case in which the reflection signal L3a acquired by the interface signal acquisition unit 152 satisfies the predetermined condition.

The power transmission unit 104 includes a power transmission control unit 162, a capacitor 164, and the power transmission coil 166. The power transmission control unit 162 is a control circuit configured to control charging of the battery 13, in other words, is a control circuit configured to control the amount of power transmitted by the power transmission coil 166. The power transmission control unit 162 is connected with the power source unit 102 through the electrical line 160. The capacitor 164 and the power transmission coil 166 are connected with the power transmission control unit 162. The capacitor 164 and the power transmission coil 166 are connected in series with each other to form a series resonance circuit. The power transmission coil 166 is supplied with the power P from the power source unit 102 through the power transmission control unit 162. The power transmission coil 166 can transmit power to the power reception coil 66 in a non-contact manner when the power reception coil 66 is provided at a position facing the power transmission coil 166.

In the charging station 100, the charging permission signal acquisition unit 105 is connected with the power transmission control unit 162. The charging permission signal acquisition unit 105 acquires the charging permission signal L0 from the charging permission signal output unit 46 of the movable body 10. Since the charging permission signal L0 is light in the present embodiment, the charging permission signal acquisition unit 105 is a light receiving element capable of receiving light of the charging permission signal L0. Specifically, the charging permission signal acquisition unit 105 detects that the charging permission signal L0 has been acquired when the charging permission signal L0 is incident thereon, and does not detect that the charging permission signal L0 has been acquired when the charging permission signal L0 is not incident thereon. When the charging permission signal L0 is acquired by the charging permission signal acquisition unit 105 while the power P is supplied from the power source unit 102, the power transmission control unit 162 supplies the power P to the power transmission coil 166 and causes the power transmission coil 166 to perform power transmission.

The power transmission unit 104 includes a movement unit 168. The movement unit 168 is a mechanism configured to move the power transmission coil 166 toward the power reception coil 66 side. The movement unit 168 moves the power transmission coil 166 toward the power reception coil 66 side when the movable body signal L2 is acquired (light thereof is received) by the station signal acquisition unit 142.

The functional configurations of the movable body 10 and the charging station 100 are as described above. Subsequently, a method of charging the movable body 10 will be described below.

Charging Method

Figure 4:
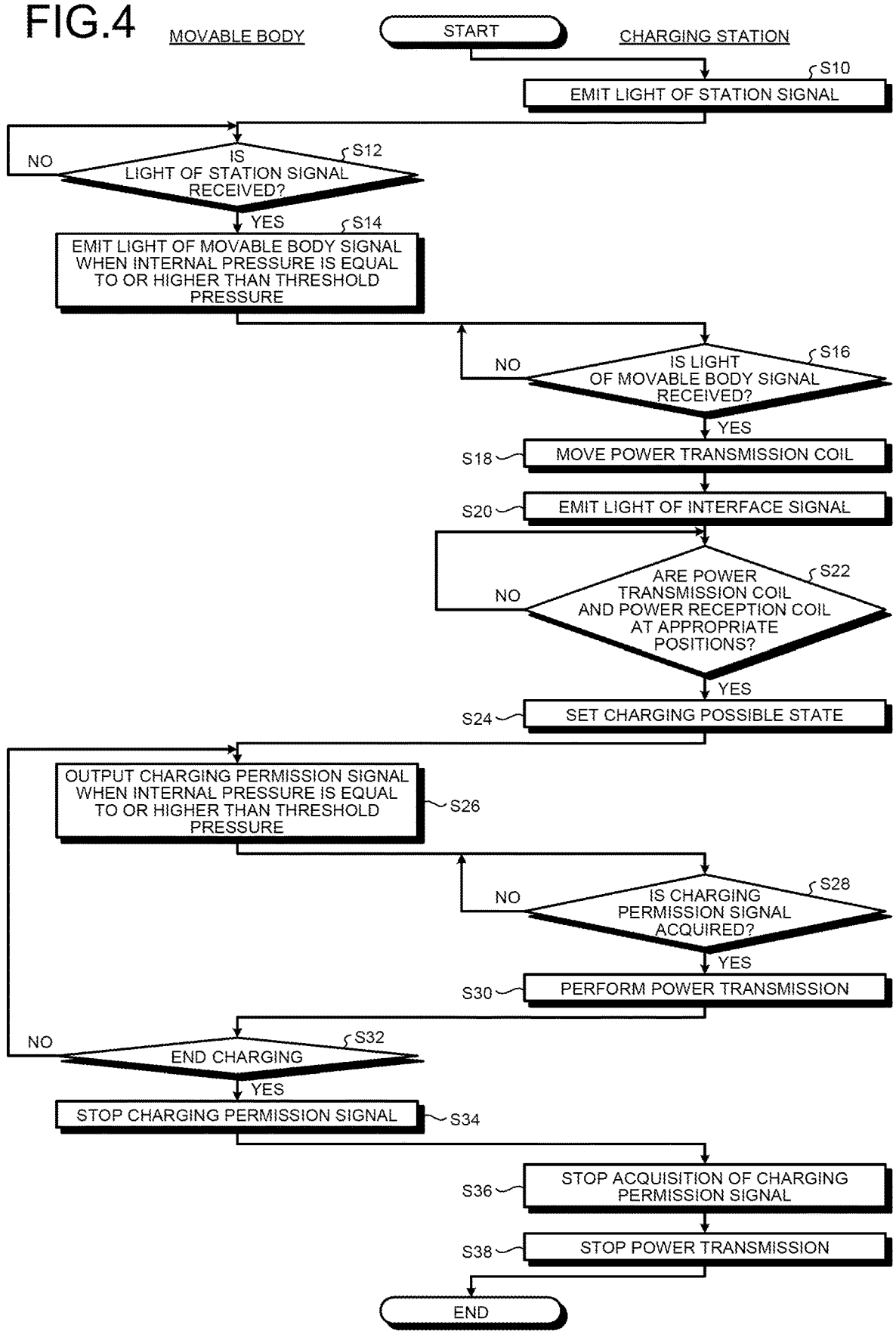
FIG. 4 is a flowchart for description of a charging method according to the present embodiment.
Figure 5:
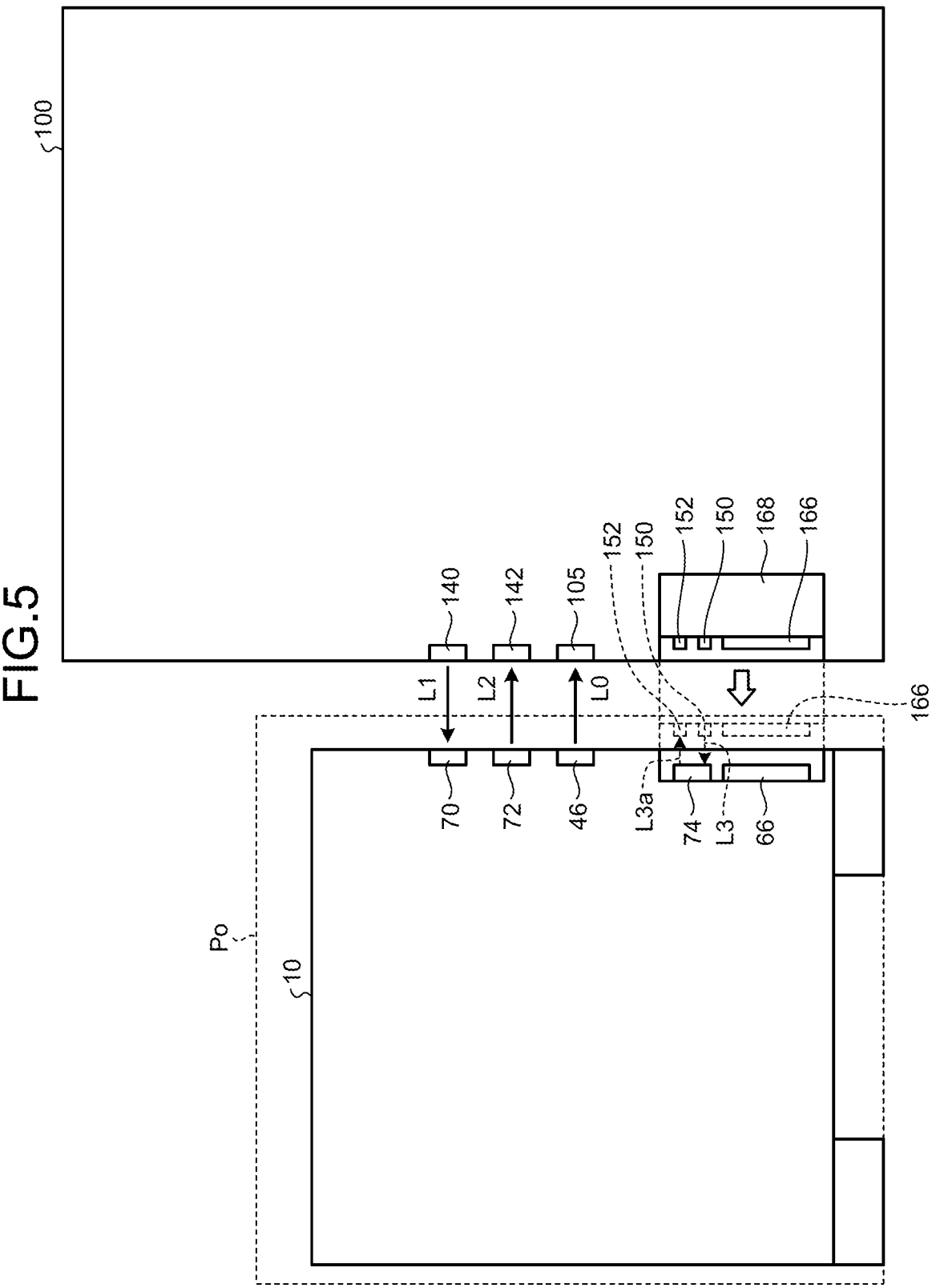
FIG. 5 is a schematic diagram illustrating positions at a time of charging of the movable body.

FIG. 4 is a flowchart for description of a charging method according to the present embodiment. FIG. 5 is a schematic diagram illustrating positions at a time of charging of the movable body. As illustrated in FIG. 4, in the charging station 100, the station signal output unit 140 emits light of the station signal L1 (step S10). The station signal output unit 140 continuously emits light of the station signal L1 during a period other than a predetermined period when the movable body 10 departs. When having determined that charging is needed, the movable body 10 moves to a position facing the charging station 100 in such a state.

More specifically, as illustrated in FIG. 5, the movable body 10 moves to the charging region Po, which is a region facing the charging station 100. As illustrated in FIG. 5, the charging region Po is set at a position where the power reception coil 66 faces the power transmission coil 166 at a predetermined distance, the reflection unit 74 faces the interface signal output unit 150 and the interface signal acquisition unit 152 at a predetermined distance, the charging permission signal output unit 46 faces the charging permission signal acquisition unit 105 at a predetermined distance, the movable body signal output unit 72 faces the station signal acquisition unit 142 at a predetermined distance, and the movable body signal acquisition unit 70 faces the station signal output unit 140 at a predetermined distance. Accordingly, when the movable body 10 is positioned in the charging region Po, the power reception coil 66 faces the power transmission coil 166, the reflection unit 74 faces the interface signal output unit 150 and the interface signal acquisition unit 152, the charging permission signal output unit 46 faces the charging permission signal acquisition unit 105, the movable body signal output unit 72 faces the station signal acquisition unit 142, and the movable body signal acquisition unit 70 faces the station signal output unit 140. The distance (predetermined distance) between the charging permission signal output unit 46 and the charging permission signal acquisition unit 105, the distance (predetermined distance) between the movable body signal output unit 72 and the station signal acquisition unit 142, and the distance (predetermined distance) between the movable body signal acquisition unit 70 and the station signal output unit 140 are set to be lengths with which each light receiving element (the charging permission signal acquisition unit 105, the station signal acquisition unit 142, or the movable body signal acquisition unit 70) can receive light from the corresponding unit that faces the corresponding light receiving element when the movable body 10 is positioned in the charging region Po.

In this manner, when the movable body 10 has arrived at the charging region Po, the movable body signal acquisition unit 70 faces the station signal output unit 140. The station signal output unit 140 emits light of the station signal L1 to a region that the station signal output unit 140 faces. Thus, when the movable body 10 is positioned in the charging region Po, the movable body signal acquisition unit 70 receives the light of the station signal L1 from the station signal output unit 140. Specifically, when having arrived at the charging region Po, the movable body 10 determines whether the light of the station signal L1 is received by the movable body signal acquisition unit 70 (step S12) as illustrated in FIG. 4. When the light of the station signal L1 is not received by the movable body signal acquisition unit 70 (No at step S12), the movable body 10 returns to step S12 and continues the determination of whether the light of the station signal L1 is received. For example, when the light of the station signal L1 is not received, the movable body 10 determines that the movable body 10 has not appropriately arrived at the charging region Po, and moves again to park in the charging region Po. When the light of the station signal L1 is received by the movable body signal acquisition unit 70 (Yes at step S12), the movable body 10 performs light emission (outputting) of the movable body signal L2 through the movable body signal output unit 72 under condition that the internal pressure of the frame 11 is equal to or higher than the threshold pressure (step S14). Specifically, the movable body signal output unit 72 emits light of the movable body signal L2 when the light of the station signal L1 is received by the movable body signal acquisition unit 70 and the internal pressure of the frame 11 is equal to or higher than the threshold pressure, in other words, the internal pressure of the frame 11 is equal to or higher than the threshold pressure based on both detection results of the pressure detection units 40A and 40B. The movable body signal output unit 72 does not emit the light of the movable body signal L2 when the light of the station signal L1 is not received by the movable body signal acquisition unit 70. In addition, the movable body signal output unit 72 does not emit the light of the movable body signal L2 when the internal pressure of the frame 11 is lower than the threshold pressure, in other words, the internal pressure of the frame 11 is lower than the threshold pressure based on at least one of the detection results of the pressure detection units 40A and 40B.

In the following processing as well, the pressure detection units 40A and 40B constantly continues detection of whether the internal pressure of the frame 11 is equal to or higher than the threshold pressure. When the internal pressure of the frame 11 has become lower than the threshold pressure, the movable body 10 puts, at least one of the contact points D1 and D2 and at least one of the contact points D3 and D4, which are illustrated in FIG. 3, into the opened states (disconnected states). Thus, when the internal pressure of the frame 11 has become lower than the threshold pressure, the movable body 10 stops emitting light of the movable body signal L2 and outputting the charging permission signal L0 to be described later and stops non-contact charging, in other words, charging work at steps described with reference to FIG. 4.

The movable body signal output unit 72 emits light of the movable body signal L2 to a region that the movable body signal output unit 72 faces. Thus, when the movable body 10 is positioned in the charging region Po, the charging station 100 receives the light of the movable body signal L2 from the movable body signal output unit 72 through the station signal acquisition unit 142. The charging station 100 determines whether the light of the movable body signal L2 has been received by the station signal acquisition unit 142 (step S16), and when the light of the movable body signal L2 has been received (Yes at step S16), the charging station 100 causes the movement unit 168 to move the power transmission coil 166 toward the power reception coil 66 (step S18). As illustrated in FIG. 5, when the movable body 10 is positioned in the charging region Po, the power transmission coil 166 and the power reception coil 66 face each other while being separated from each other at a distance longer than a distance at which non-contact charging is possible. In this state, the movement unit 168 moves the power transmission coil 166 toward the power reception coil 66, so that the power transmission coil 166 and the power reception coil 66 are brought close to each other to a distance at which non-contact charging is possible while maintaining the state of being separated from each other. The movement unit 168 is attached to the interface signal output unit 150 and the interface signal acquisition unit 152 in addition to the power transmission coil 166. Accordingly, the movement unit 168 moves the power transmission coil 166, the interface signal output unit 150, and the interface signal acquisition unit 152 to the movable body 10 side. The movement unit 168 moves the interface signal output unit 150 and the interface signal acquisition unit 152 toward the reflection unit 74 as the power transmission coil 166 moves. The movement unit 168 brings the interface signal output unit 150 and the interface signal acquisition unit 152 close to the reflection unit 74, so that the reflection unit 74 can receive light of the interface signal L3 from the interface signal output unit 150 and the interface signal acquisition unit 152 can receive light of the reflection signal L3a from the reflection unit 74. In the present embodiment, the interface signal output unit 150 and the interface signal acquisition unit 152 are attached to the movement unit 168 and moved integrally with the movement unit 168 in this manner. However, the station signal output unit 140, the station signal acquisition unit 142, and the charging permission signal acquisition unit 105 may be attached to the movement unit 168 in the charging station 100, and these units may be moved integrally with the movement unit 168.

In this manner, when the light of the movable body signal L2 from the movable body signal output unit 72 is received, the charging station 100 determines that the movable body 10 is appropriately positioned in the charging region Po, and causes the movement unit 168 to move the power transmission coil 166 to a position at which non-contact charging is possible. When the light of the movable body signal L2 is not received by the station signal acquisition unit 142 (No at step S16), the charging station 100 returns to step S16 and continues the determination of whether the light of the movable body signal L2 is received. In other words, when the light of the movable body signal L2 is not received, the charging station 100 determines that the movable body 10 is not appropriately positioned in the charging region Po, and does not move the power transmission coil 166.

After having moved the power transmission coil 166, the charging station 100 causes the interface signal output unit 150 to emit light of the interface signal L3 (step S20). The interface signal output unit 150 and the interface signal acquisition unit 152 have been brought close to the reflection unit 74 as the power transmission coil 166 has moved. Thus, when the power transmission coil 166 and the power reception coil 66 are at appropriate positions, in other words, at positions where non-contact charging is possible, the interface signal L3 from the interface signal output unit 150 is reflected as the reflection signal L3a by the reflection unit 74. Then, the light of the reflection signal L3a from the reflection unit 74 is received by the interface signal acquisition unit 152. The interface signal output unit 150 may continuously emits light of the interface signal L3 or may be controlled to emit light of the interface signal L3 by the light emission control unit 110, triggered by movement of the power transmission coil 166. The interface signal output unit 150 is separate from the reflection unit 74 before movement of the power transmission coil 166. Thus, even when light of the interface signal L3 is continuously emitted, acquisition of the reflection signal L3a by the interface signal acquisition unit 152 does not occur before step S20.

The charging station 100 determines whether the power transmission coil 166 and the power reception coil 66 are at appropriate positions, based on the reflection signal L3a from the reflection unit 74 (step S22). When the light of the reflection signal L3a received by the interface signal acquisition unit 152 satisfies the predetermined condition, in other words, the intensity of the reflection signal L3a is in the threshold intensity range, the interface position detection unit 108 of the charging station 100 determines that the power transmission coil 166 and the power reception coil 66 are at appropriate positions. When the light of the reflection signal L3a received by the interface signal acquisition unit 152 does not satisfy the predetermined condition, in other words, the intensity of the reflection signal L3a is not in the threshold intensity range, the charging station 100 determines that the power transmission coil 166 and the power reception coil 66 are not at appropriate positions.

When the power transmission coil 166 and the power reception coil 66 are at appropriate positions (Yes at step S22), the charging station 100 sets the power transmission coil 166 to a charging possible state (step S24). The charging possible state is a standby state in which power transmission from the power transmission coil 166 to the power reception coil 66 is not started but can be started. Specifically, when the light of the movable body signal L2 is received by the station signal acquisition unit 142 and the power transmission coil 166 and the power reception coil 66 are at appropriate positions, the charging station 100 puts the contact points D5 and D6 illustrated in FIG. 3 into the closed states (connected states) and puts the contact point D7 into the closed state through the switch unit 138. Accordingly, the power P from the power source unit 102 is ready to be supplied to the power transmission coil 166. In other words, in the present embodiment, the charging possible state can also be a state in which the power P from the power source unit 102 is ready to be supplied to the power transmission coil 166. When the power transmission coil 166 and the power reception coil 66 are not at appropriate positions (No at step S22), the charging station 100 does not set the power transmission coil 166 to the charging possible state but returns to step S22 and continues the appropriate-position determination. Alternatively, the charging station 100 may return to step S18 and move the power transmission coil 166 again when the coils are not at appropriate positions.

When the charging possible state is set by the charging station 100, the movable body 10 causes the charging permission signal output unit 46 to output (emit light of) the charging permission signal L0 under condition that the internal pressure of the frame 11 is equal to or higher than the threshold pressure (step S26). When the internal pressure of the frame 11 is equal to or higher than the threshold pressure, in other words, when both detection results of the pressure detection units 40A and 40B indicate that the internal pressure of the frame 11 is equal to or higher than the threshold pressure, the charging permission signal output unit 46 outputs the charging permission signal L0. When the internal pressure of the frame 11 is lower than the threshold pressure, in other words, when at least one of the detection results of the pressure detection units 40A and 40B indicates that the internal pressure of the frame 11 is lower than the threshold pressure, the charging permission signal output unit 46 does not output the charging permission signal L0.

The movable body 10 stands by for a predetermined time after the light of the movable body signal L2 is emitted at step S14, and after the standby, outputs the charging permission signal L0 under condition that the internal pressure of the frame 11 is equal to or higher than the threshold pressure. Specifically, the movable body 10 outputs the charging permission signal L0 triggered by elapse of a predetermined time, without acquiring information indicating that the charging possible state is set from the charging station 100. Alternatively, the movable body 10 may output the charging permission signal L0, triggered by acquisition of information indicating that the charging possible state is set from the charging station 100.

The charging permission signal output unit 46 outputs (emits light of) the charging permission signal L0 to a region that the charging permission signal output unit 46 faces. Thus, when the movable body 10 is positioned in the charging region Po, the charging station 100 causes the charging permission signal acquisition unit 105 to acquire (receive light of) the charging permission signal L0 from the charging permission signal output unit 46. The charging station 100 determines whether the charging permission signal L0 is acquired by the charging permission signal acquisition unit 105 (step S28), and when the charging permission signal L0 is acquired (Yes at step S28), the charging station 100 causes the power transmission control unit 162 to supply power to the power transmission coil 166, thereby performing power transmission from the power transmission coil 166 to the power reception coil 66 (step S30). In other words, the charging station 100 executes non-contact charging of the battery 13 when the movable body signal L2 from the movable body signal output unit 72 is received by the station signal acquisition unit 142 and the charging permission signal L0 is acquired by the charging permission signal acquisition unit 105. More specifically, the charging station 100 executes non-contact charging of the battery 13 when the power transmission coil 166 and the power reception coil 66 are at appropriate positions (the power transmission coil 166 and the power reception coil 66 face each other) and the charging permission signal L0 is acquired by the charging permission signal acquisition unit 105. When the charging permission signal L0 is not acquired (No at step S28), the charging station 100 does not perform power transmission from the power transmission coil 166 to the power reception coil 66 but returns to step S28 and waits for acquisition of the charging permission signal L0.

The battery 13 of the movable body 10 is charged through power transmission from the power transmission coil 166 to the power reception coil 66. Thereafter, the movable body 10 determines whether to end the charging based on, for example, the charged amount of the battery 13 (step S32). When the charging is not to be ended (No at step S32), the movable body 10 returns to step S26 and continues outputting the charging permission signal L0, thereby continuing the charging. When the charging is to be ended (Yes at step S32), the movable body 10 stops outputting the charging permission signal L0 (step S34). After outputting of the charging permission signal L0 is stopped, the charging permission signal acquisition unit 105 of the charging station 100 stops acquisition of the charging permission signal L0 (step S36). After acquisition of the charging permission signal L0 is stopped, the charging station 100 stops power transmission from the power transmission coil 166 to the power reception coil 66 (step S38) and ends the charging processing.

After charging is ended in this manner, the movable body 10 may stand by in the charging region Po while the charging possible state is maintained. In other words, the charging station 100 maintains the charging possible state at step S24 after charging is ended. When charging is needed again during the standby, the movable body 10 outputs the charging permission signal L0 again at step S26 and performs charging again. After charging, the movable body 10 may move out of the charging region Po to resume work in some cases. Subsequently, a process when the movable body 10 moves after charging will be described below.

Figure 6:
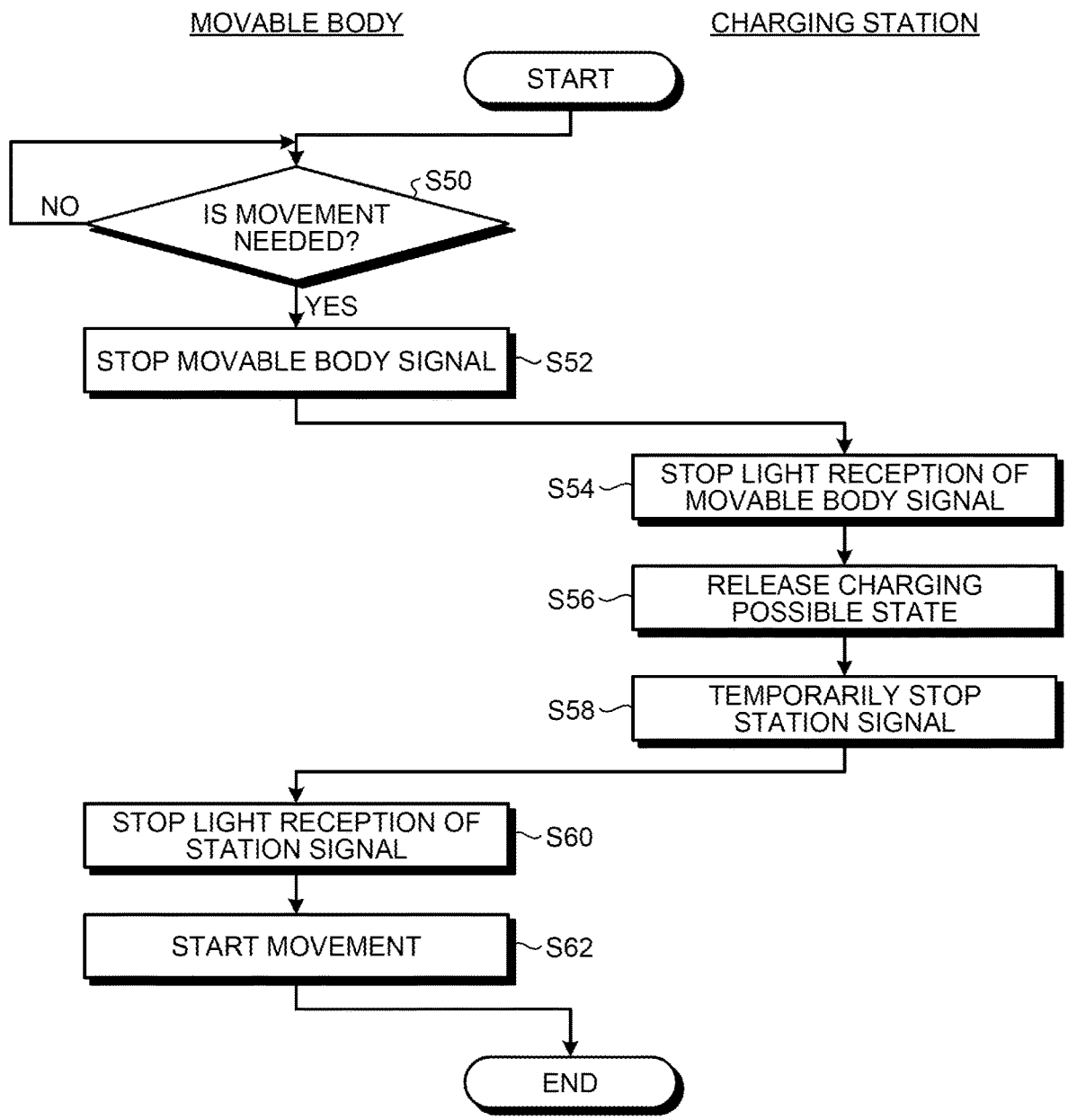
FIG. 6 is a flowchart for description of a process in which the movable body starts movement.

FIG. 6 is a flowchart for description of a process in which the movable body starts movement. As illustrated in FIG. 6, after charging, the movable body 10 determines whether the movable body 10 needs to move out of the charging region Po (step S50). When the movable body 10 needs to move (Yes at step S50), the movable body 10 stops light emission of the movable body signal L2 by the movable body signal output unit 72 (step S52). Specifically, the movable body 10 stands by in the charging region Po in the charging possible state of step S24 in FIG. 4 and continues light emission of the movable body signal L2 during the standby. However, when the movable body 10 needs to move, the movable body 10 stops light emission of the movable body signal L2. The movable body 10 is stopping outputting of the charging permission signal L0 since charging is not being performed. When the movable body 10 does not need to move (No at step S50), the movable body 10 returns to step S50 and stands by while continuing light emission of the movable body signal L2 (while in the charging possible state) until the movable body 10 needs to move.

When light emission of the movable body signal L2 is stopped, the station signal acquisition unit 142 of the charging station 100 stops light reception of the movable body signal L2 (step S54). In addition, the charging station 100 is stopping acquisition of the charging permission signal L0 since outputting of the charging permission signal L0 is being stopped as well. When light reception of the movable body signal L2 is stopped while acquisition of the charging permission signal L0 is stopped, the charging station 100 releases the charging possible state (step S56). Specifically, when light reception of the movable body signal L2 is stopped in the charging station 100, the contact point D6 as well as the contact point D7 in FIG. 3 become the opened states (disconnected states) so that power supply from the power source unit 102 to the power transmission coil 166 is impossible. In addition, when light reception of the movable body signal L2 is stopped, the charging station 100 causes the movement unit 168 to move the power transmission coil 166 farther away from the power reception coil 66. Specifically, the charging station 100 returns the power transmission coil 166 to a position at which non-contact power supply to the power reception coil 66 is impossible, in other words, a position before movement of the power transmission coil 166 at step S18 in FIG. 4. Accordingly, the charging possible state is released.

Having released the charging possible state, the charging station 100 temporarily stops light emission of the station signal L1 by the station signal output unit 140 (step S58). Specifically, triggered by the release of the charging possible state, the station signal output unit 140 stops light emission of the station signal L1 only for a predetermined time. When light emission of the station signal L1 is stopped, the movable body signal acquisition unit 70 of the movable body 10 stops light reception of the station signal L1 (step S60). When having stopped light reception of the station signal L1, the movable body 10 determines that movement preparation is completed, and starts movement (step S62). Accordingly, the present processing ends.

As described above, the charging system 1 according to the present embodiment includes the movable body 10 including the frame 11 and the battery 13 provided in the frame 11, and the charging station 100 configured to charge the battery 13. The movable body 10 includes the pressure detection unit 40 and the charging permission signal output unit 46. The pressure detection unit 40 detects the pressure inside the frame 11. The charging permission signal output unit 46 outputs the charging permission signal L0 indicating that the pressure inside the frame 11 is detected to be equal to or higher than the threshold pressure. The charging station 100 includes the charging permission signal acquisition unit 105 and the power transmission unit 104. The charging permission signal acquisition unit 105 acquires the charging permission signal L0 from the charging permission signal output unit 46. When the charging permission signal L0 is acquired by the charging permission signal acquisition unit 105, the power transmission unit 104 executes non-contact charging of the battery 13.

A movable body having an internal pressure explosion-proof structure includes a battery inside a frame having an internal pressure explosion-proof structure. Thus, when the frame is opened to charge the battery, the pressure inside the frame reduces and the internal pressure cannot be maintained. Thus, in this case, it is needed to close the frame after charging and raises the internal pressure again. However, in the charging system 1 according to the present embodiment, since the battery 13 is charged by non-contact charging, it is possible to perform the charging without opening the frame 11. Thus, according to the charging system 1, the charging can be performed without releasing a state in which the internal pressure is high. In addition, since the movable body 10 is charged in an explosive atmosphere, it is important to reduce the risk of ignition at the charging. The charging system 1 transmits the charging permission signal L0 toward the charging station 100 when the internal pressure of the frame 11 is equal to or higher than the threshold pressure. The charging station 100 performs non-contact charging of the battery 13, triggered by acquisition of the charging permission signal L0. Specifically, through the acquisition of the charging permission signal L0, the charging station 100 starts the non-contact charging after having determined that the state in which the internal pressure is high is maintained, in other words, the internal pressure explosion-proof structure is maintained and charging of the battery 13 would cause no problem. Thus, according to the charging system 1, charging can be appropriately performed while the risk of ignition is reduced without releasing the state in which the internal pressure of the frame 11 is high.

The charging permission signal output unit 46 stops outputting of the charging permission signal L0 when the pressure inside the frame 11 is detected to be lower than the threshold pressure. The power transmission unit 104 stops the non-contact charging of the battery 13 when the charging permission signal L0 is not acquired by the charging permission signal acquisition unit 105. The charging system 1 stops the non-contact charging by stopping outputting the charging permission signal L0 when the internal pressure of the frame 11 has reduced, in other words, internal pressure explosion proof potentially cannot be maintained. Thus, according to the charging system 1, the risk of ignition by charging can be reduced.

The movable body 10 includes the movable body signal output unit 72. The movable body signal output unit 72 outputs a signal (the movable body signal L2) to a region that the movable body signal output unit 72 faces. The charging station 100 includes the station signal acquisition unit 142 capable of acquiring light of the movable body signal L2 from the movable body signal output unit 72. The power transmission unit 104 executes non-contact charging of the battery 13 when light of the movable body signal L2 from the movable body signal output unit 72 is received by the station signal acquisition unit 142 and the charging permission signal L0 is acquired by the charging permission signal acquisition unit 105. The movable body signal output unit 72 outputs the movable body signal L2 to the region that the movable body signal output unit 72 faces. The station signal acquisition unit 142 acquires the movable body signal L2 when positioned in the region that the movable body signal output unit 72 faces, in other words, when the movable body 10 is positioned in the charging region Po. The power transmission unit 104 executes the non-contact charging when the movable body signal L2 is received. Specifically, the charging station 100 executes the charging when having checked that the movable body 10 is positioned in the charging region Po based on the movable body signal L2 and having checked that the internal pressure explosion-proof structure is maintained based on the charging permission signal L0. Thus, according to the charging station 100, the movable body 10 can be appropriately charged. In particular, the charging station 100 checks the position of the movable body 10 through acquisition of the movable body signal L2 from the movable body 10, thereby highly accurately checking the position of the movable body 10.

The charging station 100 further includes the station signal output unit 140 configured to output a signal (the station signal L1) to a region that the station signal output unit 140 faces. The movable body 10 includes the movable body signal acquisition unit 70 capable of acquiring the station signal L1 from the station signal output unit 140 when positioned in the region that the station signal output unit 140 faces. The movable body signal output unit 72 outputs the movable body signal L2 when the station signal L1 from the station signal output unit 140 is acquired by the movable body signal acquisition unit 70. The movable body 10 receives the station signal L1 from the station signal output unit 140 when the station signal output unit 140 is positioned in the region facing the station signal output unit 140, in other words, is positioned in the charging region Po. When having received the station signal L1, the movable body signal output unit 72 outputs the movable body signal L2. Thus, the charging system 1 determines that the movable body 10 is positioned in the charging region Po when the station signal L1 from the charging station 100 is received by the movable body 10 and the movable body signal L2 from the movable body 10 is received by the charging station 100, and then performs non-contact charging. Thus, according to the charging system 1, the movable body 10 and the charging station 100 can each check the position of the other, and thus the position of the movable body 10 can be more highly accurately checked.

The movable body 10 includes the power reception coil 66 connected with the battery 13. The power transmission unit 104 of the charging station 100 includes the power transmission coil 166 configured to transmit electricity to the power reception coil 66 in a non-contact manner, the movement unit 168 configured to move the power transmission coil 166 toward the power reception coil 66, and the power transmission control unit 162 configured to cause the power transmission coil 166 to perform power transmission. The movement unit 168 moves the power transmission coil 166 to a position facing the power reception coil 66, in other words, a position where non-contact charging is possible. The power transmission control unit 162 causes the power transmission coil 166 to perform power transmission when the power transmission coil 166 is at the position facing the power reception coil 66 and the charging permission signal L0 is acquired by the charging permission signal acquisition unit 105. The charging system 1 performs positioning of the power transmission coil 166 and the power reception coil 66 by checking whether the power transmission coil 166 is at the position facing the power reception coil 66. Then, non-contact charging is performed when a result of the positioning of the power transmission coil 166 and the power reception coil 66 is appropriate. Thus, according to the charging system 1, non-contact charging can be appropriately performed.

The charging station 100 includes the interface position detection unit 108 configured to detect whether the power transmission coil 166 and the power reception coil 66 are at appropriate positions. The power transmission control unit 162 causes the power transmission coil 166 to perform power transmission when the power transmission coil 166 and the power reception coil 66 are at appropriate positions. The charging system 1 performs non-contact charging when the power transmission coil 166 and the power reception coil 66 are at predetermined appropriate positions. Thus, according to the charging system 1, non-contact charging can be appropriately performed.

The frame 11 of the movable body 10 has an internal pressure explosion-proof structure. The charging system 1 can excellently charge the battery 13 of the movable body 10 having the internal pressure explosion-proof structure without releasing an internal pressure explosion-proof state.

The charging station 100 according to the present embodiment charges the movable body 10 including the frame 11, the battery 13 provided in the frame 11, and the pressure detection unit 40 configured to detect the pressure inside the frame 11, and includes the charging permission signal acquisition unit 105 and the power transmission unit 104. The charging permission signal acquisition unit 105 acquires the charging permission signal L0 indicating that the pressure inside the frame 11 is equal to or higher than the threshold pressure from the movable body 10. The power transmission unit 104 executes non-contact charging of the battery 13 when the charging permission signal L0 is acquired by the charging permission signal acquisition unit 105. According to the charging station 100, charging can be appropriately performed while the risk of ignition is reduced without releasing the state in which the internal pressure of the frame 11 is high.

The movable body 10 according to the present embodiment includes the frame 11, the pressure detection unit 40 configured to detect the pressure inside the frame 11, the charging permission signal output unit 46, and the power reception unit 44. The charging permission signal output unit 46 outputs, to the charging station 100, the charging permission signal L0 indicating that the pressure inside the frame 11 is detected by the pressure detection units 40 to be equal to or higher than the threshold pressure. The power reception unit 44 is charged in a non-contact manner from the charging station 100 having acquired the charging permission signal L0. According to the movable body 10, charging can be appropriately performed while the risk of ignition is reduced without releasing the state in which the internal pressure of the frame 11 is high.

In the charging method according to the present embodiment, the movable body 10 including the frame 11 and the battery 13 provided in the frame 11 is charged by a charging device (the charging station 100). The charging method includes a charging permission signal outputting step of outputting the charging permission signal L0 from the movable body 10 toward the charging device when the pressure inside the frame 11 is detected to be equal to or higher than the threshold pressure, and a charging step of executing non-contact charging of the battery 13 when the charging permission signal L0 is acquired by the charging device. According to the charging method, charging can be appropriately performed while the risk of ignition is reduced without releasing the state in which the internal pressure of the frame is high.

The embodiment of the present invention is described above but not limited to the content of the present embodiment. The above-described components include those easily thought of by the skilled person in the art, those identical in effect, and equivalents. The above-described components may be combined as appropriate. The components may be omitted, replaced, and changed in various kinds of manners without departing from the scope of the above-described embodiment.

REFERENCE SIGNS LIST 1 charging system
10 movable body
11 frame
13 battery
40 pressure detection unit
44 power reception unit
46 charging permission signal output unit
48 movable body position detection unit
66 power reception coil
70 movable body signal acquisition unit
72 movable body signal output unit
74 reflection unit
100 charging station
104 power transmission unit
105 charging permission signal acquisition unit
106 station position detection unit
108 interface position detection unit
140 station signal output unit
142 station signal acquisition unit
150 interface signal output unit
152 interface signal acquisition unit
L0 charging permission signal
L1 station signal
L2 movable body signal
L3 interface signal

The invention claimed is:

1. A charging system comprising:
a movable body including a frame and a battery provided in the frame; and
a charging station configured to charge the battery, wherein
the movable body includes
a pressure detection unit configured to detect pressure in the frame, and
a charging permission signal output unit configured to output a charging permission signal indicating that the pressure in the frame is detected to be equal to or higher than a threshold pressure, and
the charging station includes
a charging permission signal acquisition unit configured to acquire the charging permission signal from the charging permission signal output unit, and
a power transmission unit configured to execute non-contact charging of the battery when the charging permission signal is acquired by the charging permission signal acquisition unit.

2. The charging system according to claim 1, wherein the charging permission signal output unit stops outputting the charging permission signal when the pressure in the frame is detected to be lower than the threshold pressure, and the power transmission unit stops the non-contact charging of the battery when the charging permission signal is not acquired by the charging permission signal acquisition unit.

3. The charging system according to claim 1, wherein
the movable body includes a movable body signal output unit configured to output a signal to a region that the movable body signal output unit faces,
the charging station includes a station signal acquisition unit configured to acquire the signal from the movable body signal output unit, and
the power transmission unit executes the non-contact charging of the battery when the signal from the movable body signal output unit is received by the station signal acquisition unit and the charging permission signal is acquired by the charging permission signal acquisition unit.

4. The charging system according to claim 3, wherein
the charging station includes a station signal output unit configured to output a signal to a region that the station signal output unit faces,
the movable body includes a movable body signal acquisition unit configured to acquire the signal from the station signal output unit when positioned in the region that the station signal output unit faces, and
the movable body signal output unit outputs a signal when the signal from the station signal output unit is acquired by the movable body signal acquisition unit.

5. The charging system according to claim 1, wherein
the movable body includes a power reception coil connected with the battery,
the power transmission unit of the charging station includes
a power transmission coil configured to transmit power to the power reception coil in a non-contact manner,
a movement unit configured to move the power transmission coil toward the power reception coil, and
a power transmission control unit configured to cause the power transmission coil to perform power transmission,
the movement unit moves the power transmission coil to a position facing the power reception coil, and
the power transmission control unit causes the power transmission coil to perform power transmission when the power transmission coil is at the position facing the power reception coil and the charging permission signal is acquired by the charging permission signal acquisition unit.

6. The charging system according to claim 5, wherein
the charging station includes an interface position detection unit configured to detect whether the power transmission coil and the power reception coil are at appropriate positions, and
the power transmission control unit causes the power transmission coil to perform power transmission when the power transmission coil and the power reception coil are at the appropriate positions.

7. The charging system according to claim 1, wherein the frame of the movable body has an internal pressure explosion-proof structure.

8. A charging station for charging a movable body that includes a frame, a battery provided in the frame, and a pressure detection unit configured to detect pressure in the frame, the charging station comprising:
a charging permission signal acquisition unit configured to acquire, from the movable body, a charging permission signal indicating that the pressure in the frame is equal to or higher than a threshold pressure; and a power transmission unit configured to execute non-contact charging of the battery when the charging permission signal is acquired by the charging permission signal acquisition unit.

9. A movable body comprising:

a frame;

a pressure detection unit configured to detect pressure in the frame;

a charging permission signal output unit configured to output, to a charging station, a charging permission signal indicating that the pressure in the frame is detected, by the pressure detection unit, to be equal to or higher than a threshold pressure; and a power reception unit configured to be charged in a non-contact manner from the charging station having acquired the charging permission signal.

* * * * *